United States Patent
Chacon De Freitas Filho

(10) Patent No.: US 11,964,923 B2
(45) Date of Patent: Apr. 23, 2024

(54) GRANULATED ORGANIC AND ORGANOMINERAL FERTILIZER SUPPLEMENTED WITH BIOLOGICAL ADDITIVE AND PROCESS FOR THE PRODUCTION OF GRANULATED ORGANIC AND ORGANOMINERAL FERTILIZER SUPPLEMENTED WITH BIOLOGICAL ADDITIVE

(71) Applicant: SUPERBAC BIOTECHNOLOGY SOLUTIONS S.A, Cotia (BR)

(72) Inventor: Luiz Augusto Chacon De Freitas Filho, Sao Paulo (BR)

(73) Assignee: SUPERBAC BIOTECHNOLOGY SOLUTIONS S.A., Cotia (BR)

( * ) Notice: Subject to any disclaimer, the term of this patent is extended or adjusted under 35 U.S.C. 154(b) by 0 days.

(21) Appl. No.: 14/971,347

(22) Filed: Dec. 16, 2015

(65) Prior Publication Data
US 2016/0176766 A1 Jun. 23, 2016

(30) Foreign Application Priority Data
Dec. 17, 2014 (BR) ...................... 10 2014 013660 4

(51) Int. Cl.
| | | |
|---|---|---|
| C05B 17/00 | (2006.01) | |
| C05B 19/00 | (2006.01) | |
| C05F 11/08 | (2006.01) | |
| C05G 5/12 | (2020.01) | |

(52) U.S. Cl.
CPC .............. *C05B 17/00* (2013.01); *C05B 19/00* (2013.01); *C05F 11/08* (2013.01); *C05G 5/12* (2020.02)

(58) Field of Classification Search
None
See application file for complete search history.

(56) References Cited

U.S. PATENT DOCUMENTS

| | | | | |
|---|---|---|---|---|
| 3,178,267 A | * | 4/1965 | Larson ..................... | C05B 17/00 422/109 |
| 4,971,616 A | * | 11/1990 | Glogowski ............... | C05F 3/00 71/10 |
| 5,082,486 A | * | 1/1992 | Glogowski ............... | C05F 3/00 71/10 |

(Continued)

FOREIGN PATENT DOCUMENTS

| | | | | |
|---|---|---|---|---|
| EP | 1323692 A2 | * | 7/2003 | ............... C05C 9/02 |
| EP | 2253374 A1 | * | 11/2010 | ............... B01J 2/16 |

(Continued)

*Primary Examiner* — Wayne A Langel
(74) *Attorney, Agent, or Firm* — Sheppard Mullin Richter & Hampton LLP

(57) ABSTRACT

A granulated organic and organomineral fertilizer supplemented with biological additive and process for the production of granulated organic and organomineral fertilizer supplemented with biological additive is physically presented in the form of granules (G), having its formulation defined by the combination of organic and mineral matter (N,P,K), to which it is added, in addition, a bioburden in the form of bacteria, fungus and yeast that are selected to crops of interest, whether grasses, legumes, monocotyledons and dicotyledons, the granules (G) receive the bioburden at the time of its granulation; the selection of bioburden to be included in granules (G) is established according to the soil and crop analysis to be cultivated.

4 Claims, 1 Drawing Sheet

(56) References Cited

U.S. PATENT DOCUMENTS

| | | | | |
|---|---|---|---|---|
| 5,607,494 A * | 3/1997 | Kim | ................ | C05F 11/04 47/58.1 R |
| 5,648,264 A * | 7/1997 | Kume | ................ | C02F 3/34 422/5 |
| 5,772,721 A * | 6/1998 | Kazemzadeh | ......... | C05D 3/02 241/2 |
| 6,387,145 B1 * | 5/2002 | Miele | ................ | C05B 7/00 71/17 |
| 6,415,982 B2 * | 7/2002 | Bridgelall | ......... | G06K 7/10851 235/383 |
| 6,416,982 B1 * | 7/2002 | Zhang | ................ | C05F 11/08 424/93.21 |
| 6,416,983 B1 * | 7/2002 | Cheung | ................ | C05F 11/08 435/171 |
| 6,425,933 B1 * | 7/2002 | McDaniel | ......... | B02C 19/06 241/29 |
| 2002/0053229 A1 * | 5/2002 | Varshovi | ................ | C05D 9/00 71/6 |
| 2002/0187552 A1 * | 12/2002 | Cheung | ................ | A01N 63/04 435/446 |
| 2003/0005734 A1 * | 1/2003 | Cheung | ................ | C05F 3/00 71/21 |
| 2003/0044964 A1 * | 3/2003 | Cheung | ................ | C05F 11/08 435/254.2 |
| 2009/0082205 A1 * | 3/2009 | Stock | ................ | A01G 25/092 504/117 |
| 2013/0186155 A1 * | 7/2013 | Blaine | ................ | C05F 3/00 71/21 |
| 2015/0203414 A1 * | 7/2015 | Cook | ................ | C05D 9/00 71/7 |

FOREIGN PATENT DOCUMENTS

| | | | | |
|---|---|---|---|---|
| GB | 2084557 A | * | 4/1982 | ............ C05B 19/00 |
| WO | WO 2012/007760 A1 | * | 1/2012 | ................ C05F 5/00 |

* cited by examiner

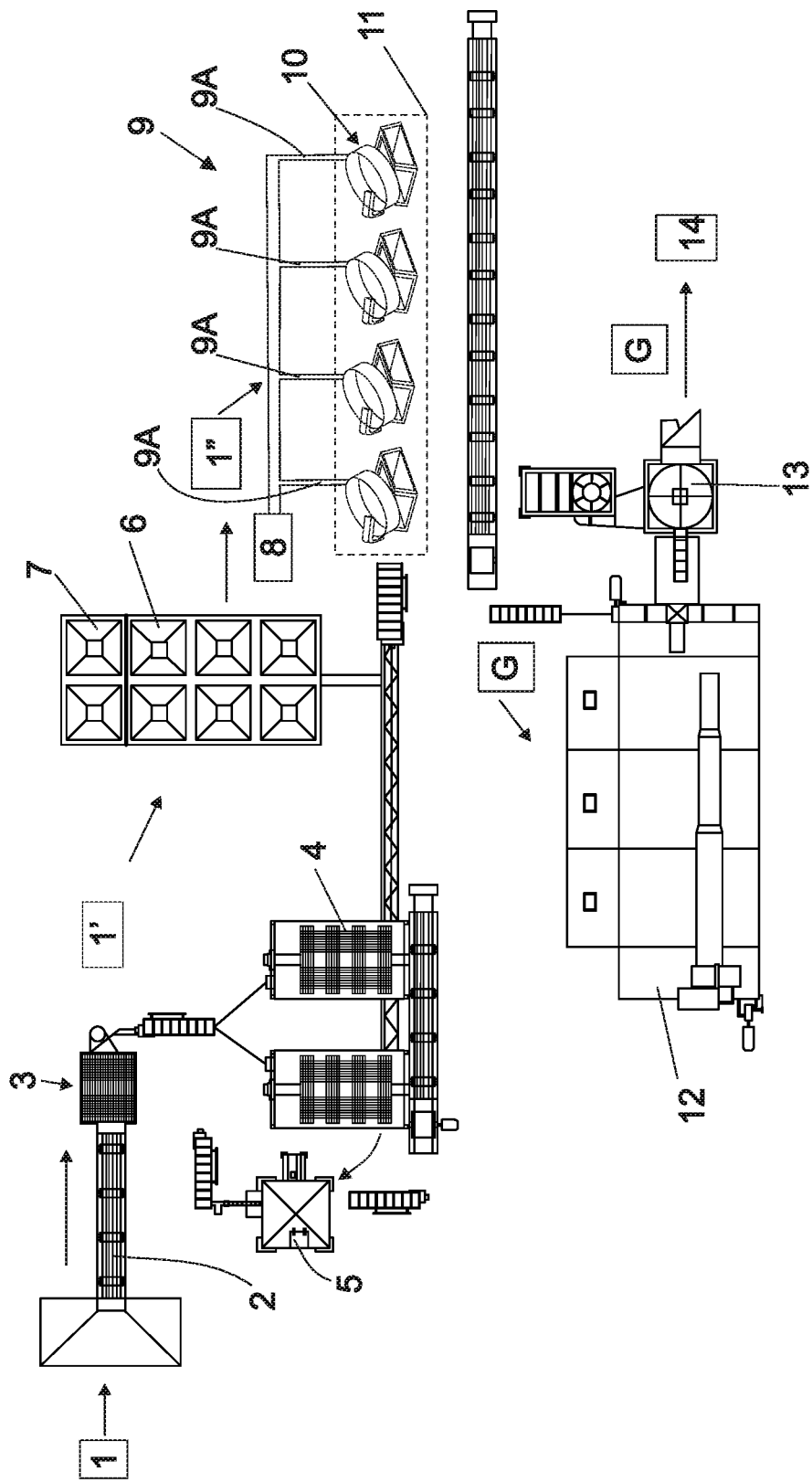

GRANULATED ORGANIC AND ORGANOMINERAL FERTILIZER SUPPLEMENTED WITH BIOLOGICAL ADDITIVE AND PROCESS FOR THE PRODUCTION OF GRANULATED ORGANIC AND ORGANOMINERAL FERTILIZER SUPPLEMENTED WITH BIOLOGICAL ADDITIVE

The object of this invention patent application is a process for the production of granulated organic and organomineral fertilizer supplemented with biological additive as well as the product resulting from such process which is the granulated organic and organomineral fertilizer supplemented with biological additive, of agricultural application.

BACKGROUND OF THE INVENTION

This invention patent application proposes a new type of fertilizer that comes from an organic and organomineral gender fertilizer and physically configured in the form of granules, which innovates by the fact of having biological additives in its formulation, a consortium of microorganisms of specific agricultural function. The present invention patent application addresses the process through which the aforementioned fertilizer is obtained.

One soil is considered fertile when presenting all the nutrients in suitable quantities and does not present toxic elements to the plant growth. Fertile soils are generally located in regions with satisfactory amount of water and light, in addition to be free of pest infestation and diseases that may hinder the plant growth. Although all the productive soils are fertile, not every fertile soil is productive.

Regarding the factors affecting the soil productivity they are: a) organic matter; b) minerals; e) soil microbiota.

The organic matter acts as a conditioner, which enhances the structure and the state of the soil particles aggregation, decreases the density and increases its aeration. It also acts as a chelating of the minerals, retaining certain nutrients and mineral fertilizer against excessive leaching and significant losses.

Organic matter can be caused by the decomposition of plant, animal matter or by the accumulation of microbial biomass. Humus, insoluble fraction of the organic matter and most abundant organic compound in the soil, is responsible for the ion exchange of the nutrients and for the formation of fixed nitrogen reservoirs. The humus also promotes a buffer effect and improves the pH control capability, an important mechanism for maintaining a productive soil. The organic matter classified as soluble is represented by the product of the degradation of complex polymers such as: sugars, phenols and amino acids.

With regard to the minerals, in order to a plant develops normally, it needs some indispensable prerequisites: favorable place to fix their roots, proper temperature, sunlight, air, sufficient amount of water and nutrients. These needs are met to a greater or lesser extent by the climatic and soil conditions of the place where the plant is located.

Higher plants provided with chlorophyll use carbon, oxygen, and hydrogen, withdrawn from the air, in addition to water and several elements from the soil, and can, with the aid of energy supplied by the sunlight, synthesizing the organic matter necessary for its own formation. Thus through the photosynthesis, the plants are capable of forming organic compounds of simple structure even more complex structure compounds such as cellulose, starch, several sugars, fats, proteins, enzymes, and vitamins. A total of 18 organic and minerals elements considered essential for the plants. Carbon, hydrogen and oxygen, originated from the water and the air are responsible for forming 90-96% of the plant tissues.

However, the mineral nutrients are usually classified as macro and micronutrients according to their relative concentration in the tissue, or as the concentration required for the proper growth of the plants. Such division in considered as follows:

Macronutrients: Required in larger quantities by the plants, on the order of kg/ha: nitrogen (N), phosphorus (P), potassium (K), calcium (Ca), magnesium (Mg) and sulfur (S) and b) Micronutrients: Required in smaller quantities, on the order of g/ha: boron (B), chlorine (Cl), copper (Cu), iron (Fe), manganese (Mn), molybdenum (Mo), nickel (Ni) and zinc (Zn). The increased productivity is related to the balance of the nutrients in the quantities required by the plants throughout the development cycle.

Regarding the soil microbiota, the fact that the soil is the largest reservoir of microorganisms on the planet, with great abundance and diversity of microorganism should be considered; it is estimated to be 4 tons of microorganisms per hectare of soil. They are responsible for the life maintenance and nutrients cycling on the planet because they act in the decomposition and mineralization of the organic matter.

Further, microorganisms exert physical action in the soil. Acting chemically by producing cementing substances, such as polysaccharides or bonding substances such as fungal hyphae that increase the aggregation, the porosity and stability of the soil. Thus, they also improve aeration, retention and availability of the water and nutrients to the plants. The relationship between microorganisms and plants are usually established by symbiosis, the plant synthesize food (sugars) assimilated by the microbes and these, in turn, convert air nitrogen into nitrogen in the form that can be assimilated by the plants. The same occurs for the other nutrients, such as P, K, Mg and Ca. The microorganisms can also synthesize antibiotics that fight pathogens that cause diseases to the plants.

The current state of the art includes the use of organomineral fertilizers, which were developed by manufacturers of organic fertilizers before the need for soil enrichment with micro and macronutrients. Thus, the organomineral fertilizers are products mainly organic, however, enriched with nutrient sources of soluble mineral. Currently, the organomineral mixtures consist of proportion of 50% of organic manure and 50% of mineral fertilizer.

The organomineral fertilizers present several advantages when used in agriculture, among which they may be listed: a) Raises holding capacity and absorption of the water from the soil; b) Decreases the apparent density of the soil; c) Increase the soil porosity; and d) Increase the ability of soil cation exchange by humic mycelial action. It is known that the humified organic fraction proved work as a conditioning of the mineral fertilizers and that the greater the exposure surface of the humus colloid, the greater will be its ability to retain nutrients and grant them to the plants. Another positive aspect of the use of organomineral fertilizers is e) The immediate availability of the nutrients conditioned by the humic and fulvic fraction. This factor is crucial in the agricultural production cycle, since, depending on the plant development and or the time of the year, there are times with high demand of the nutrient. The combination of organic and mineral fertilizers is also advantageous in f) Financial aspect. The organomineral manure stimulates the proliferation of microorganisms acting on the solubilisation and mineralization rate, of the $N_2$, P, and K, thereby increasing availability thereof and resulting in a reduction of future dosages. Thus, the organomineral fertilizers constitute an important option for the management of the fertility and mineral nutrition of the plants. The moment is very favorable for expanding the range of products available in the market with various technologies. The diversification of the possibilities to the producer is always an important tool in the search from competitive productivity in the market and, accordingly, organomineral fertilizers can have a pride of place in the production system.

Several studies show that the performance of this organomineral fertilizer is higher compared to the mineral products, typically used by the producers; this is due to the slow utilization in small proportions of crops in general. Therefore, the rest of these elements lost by leaching is absorbed by microorganisms or insolubilized in the soil, while those that are present in the organomineral fertilizer have much higher utilization rates.

As the organomineral fertilizer composition should provide 50% of organic matter, there is a saving of at least 50% of the need for mineral fertilizers. The lower use of mineral fertilizers also reduces the impact from the ecological point of view, knowing that the fertilizers are non-renewable sources of minerals. As great part of the minerals is from other countries, the reduction on the use of mineral fertilizers in the production of organomineral also reduces the cost spent on the fertilization of the crops.

The combination of the use of organic matter with mineral fertilizer makes use of the mineral fertilizer more efficient for the plants. The presence of organic matter in the form of humus has the property of easily absorbing water. This helps dissolve the mineral manure salts, favoring the assimilation by the plants. Currently, the organic fraction of the organomineral fertilizers are derived from agricultural waste (poultry litter, pig manure and other animals), and agricultural waste (bagasse and sugarcane vinasse, peat and waste from other crops). Factors, such as quantity, quality and availability will define the composition of the organic part of the organomineral fertilizers. The granulated organomineral fertilizer with N, P, K in the grain, is obtained by the combination between organic matter and minerals. Its use replaces the purely mineral fertilizer, with huge advantage, because there is a gradual release of nutrients caused by the encapsulation of the minerals by the organic matrix. As a result to a higher availability of organic matter in the soil, the natural microbiota of the same is activated. The main functions of the soil microorganisms regarding agronomic aspect are:

Decomposition of organic matter to better availability of the nutrients: The microorganisms promote the decomposition of the organic matter of the soil and releases nutrients such as carbon (C), nitrogen ($N_2$) and other components, part of the elements returns to the atmosphere in gaseous form, others remain available for the plants in the soil solution and another part is lost by leaching.

$N_2$ fixing: The biological $N_2$ fixation consists in capturing the chemical element from the atmosphere in a relatively inert molecular form ($N_2$) and it is converted into nitrogen compounds such as ammonium ($NH4^+$) or nitrate ($NO_3^-$), which are assimilated by the plants and are an important part of their nutrition. Examples are diazotrophics bacteria which may be associated with the plant roots by symbiosis, relationship that benefits all the involved, the bacteria use part of the photoassimilates of the host plant to generate the energy necessary to promote biological fixation of $N_2$, while the plant benefits from the fixed $N_2$ by the bacteria for synthesis of their proteins. The greatest example of diazotrophics bacteria association and plants occurs between bacteria mainly of the *Rhizobium* with the roots of plants from the legume family (Fabaceae), characterizing a kind of symbiosis. The association occurs through inoculation of the diazotrophics bacteria naturally occurring in the soil with the roots of the legumes or, just before, by the artificial inoculation in legume seeds, this technology shows itself capable of considerably reducing nitrogen mineral fertilizers and, in some cases, replaces it completely. The combination of nitrogen-fixing bacteria can also occur in grasses (Poaceae), but, in this case, there will be no formation of nodules on the roots such as occurs with the legumes and atmospheric $N_2$ fixation will only occur when there is no oxygen accumulation in its surroundings.

K Solubilization: The microorganisms in the soil can affect the absorption of K by the plants by solubilizing the K portion not available in the soil solution or by competing with them for obtaining the element.

P Solubilization: The microorganisms collaborate for the development of root system (mycorrhizae) of the plants, increasing the contact area of the roots with the nutrients of the soil solution, which influences directly on the ability of the plants to absorb the P. These microorganisms are also responsible by the solubilization of the P, since they excrete organic acids, which dissolve the phosphatic matter. However, the P organic forms can be mineralized by microorganism producers of enzymes, such as phosphatases and phytases.

They synthesize antibiotics that fight the plants pathogens: Many microorganisms are considered essential to the ecosystem by the great ability to suppress soil pathogens. They are naturally occurring species, in high populations, they are nutritionally versatile and have the ability to grow in a wide range of environmental conditions, in addition to produce a large variety of antibiotics, siderophores and plant growth hormones. Antibiotics are organic compounds of low molecular weight, which, in low concentrations, are detrimental to the growth or to other metabolic activities of other organisms. Studies involving these microorganisms have intensified in recent years because of the increased interest in alternatives to control plant pathogens. These bacteria are likely to be used as commercial inoculants, facilitating its use by the farmers.

Rooting: Bacteria are phytohormones producers that stimulate the rooting and growth of the inoculated plants. Auxin and ethylene are known as regulators of various processes that modify the architecture of the root system, including the primary root formation stretching and elongation formation of root hair.

Growth Phytohormones: Some microorganisms may also be characterized by being plant growth promoters, which colonize the rhizosphere and produce hormones, which promote the plant growth and, therefore, improve the crops agronomic performance.

Microorganisms also promote the gradual release of the nutrients to the soil solution, where they will be gradually available to the plants to be absorbed. This process ensures a significant reduction of the nutrient loss of the traditional fertilizers, such as nitrogen volatilization, phosphorus fixing and potassium and nitrate leaching. As the loss of mineral components is reduced, the fertilization can be done in a single moment of application. The organic matter present in the manure also guarantees the replenishment of the nutrients, soil microbiology development and increases the soil's ability to retain water. By being granulated, there is the possibility to proceed with its handling in any planter.

Regarding the production process of the organic and organomineral fertilizers in which poultry manure is used as organic raw material, the following steps can be highlighted:

a) Pre-cleaning of the poultry manure in natura in rotating screens (removal of coarser matter), b) crushing of the matter (so that the product is in powder form) and c) granulating and process by which powder particles are transformed into granules through mechanical stirring process, respectively).

Granulation is the process by which very fine powder particles adhere together to form a larger particle, denominated granules. As the physical configuration in the most common spherical shape, the granules may present size from 0.02 mm to 50 mm.

Various methods can be applied in order to obtain granules, the most common being: a) Agglomeration by stirring: In this method, the fine particles to be granulated are agglomerated through the constant stirring in the presence of a binding agent (examples: potato starch or cassava, sugarcane molasses, beeswax, arabic gum). Special equipment as inclined rotating drums; cones and rotating pot/plates are normally used; b) Agglomeration by spraying: In this method, the particles to be granulated ad the binding agent are fluidized and then lyophilized.

The finished granule is then blended with minerals in proportion according to the formulation required for the crop to be installed.

The current state of the art also includes the patent application of the same applicant, which was deposited on Nov. 25, 2014 under the protocol number BR 10 2014 029382-5, and that addresses the "GRANULATED ORGANIC AND ORGANOMINERAL FERTILIZER SUPPLEMENTED WITH BIOLOGICAL ADDITIVE AND PROCESS FOR THE PRODUCTION OF GRANULATED ORGANIC AND ORGANOMINERAL FERTILIZER SUPPLEMENTED WITH BIOLOGICAL ADDITIVE".

Said prior patent application proposes that organic or organomineral fertilizer in pelletized or granulated form are coated with a biologic additive thus aiming to improve the transfer efficiency of the nutrients contained therein, and for the bioburden aggregate to them can act positively in the improvement of the development of the crop for which they are intended.

In the above mentioned patent document, it is proposed that the bioburden to be added to the fertilizer to be applied by coating, such systematic that comprises two distinct forms, one by coating and other by spraying.

In the two types of coating, the fertilizer already done (either in the form of pellets or granules) must, then, be submitted to a special and posterior stage according to which it is aggregated with bioburden.

In the case of the fertilizer being in the form of pellets, the same, in the coating process, receives the application of organic polymers with additives in order to obtain organic and/or organomineral pellets coated with biological additives, where the organic and/or organomineral pellets are fed, and a rotary drum, where the application of a coating fluid configured as an additive polymer with bioburden, through spraying by nozzles and through specific movement of the rotating cylinder.

The said previous document proposes further that the pellets receive a bioburden through spraying process in the form of an additive spraying fluid with bioburden with a view to obtaining organic pellets sprayed with biological additives.

In this alternative process, the pallets are driven by a conveyor belt and, in this trajectory, pass under spraying nozzles where they receive spraying with biological additives applied in the form of spraying fluid with bioburden.

The spraying directly aggregates the biological additive to the surface of the organomineral fertilizer by means of a system with atomizer using vehicles such as water and vegetable oil in a "rotospray" which allows spraying liquids without changing the original pellet characteristics, such as their grain size.

The same kind of processing is also applied to the fertilizer in the form of granules, that is, the fertilizer in the form of granules may be subjected to coating process that can occur both by coating and also by spraying.

Currently, the conformation of the organomineral fertilizer does not promote proper distribution in field, as the said fertilizer components have different densities, the distribution with agricultural machinery ends up being uneven in the field.

Furthermore, the addition of the biological additive after the granulation process, although it means an advancement in relation to the conventional fertilizers, it also incurs in necessarily requiring an extra step in the production process adding cost to the final product.

Therefore, it is interesting adding the additive during the granulation process. Thus, an alternative to such is the addition of the microbiological consortium together with the raw material, organic matter and NPK during the granulation process.

SUMMARY OF THE INVENTION

Before the state of the art afore described, it is set up as one of the objectives of this invention patent application, the achievement of an granulated organic and organomineral fertilizer containing biological additives in its formulation, which, in addition to stimulating a greater efficiency in the productivity of the crops applied, avoids processes subsequent to the granulation, such as coating and/or spraying of the biological additives and, thereby, simplifies the process and reducing the costs.

Another object of this invention patent application lies in providing a new type of fertilizer that can be configured as an interesting alterative to the producers in the agricultural area.

The present patent of invention proposes a new granulated organic or organomineral fertilizer with the presence of biological matter (biological additives) in its formulation, being said fertilizer obtained by a process, where the matter's bioburden is applied at the time of the granulation, dispensing, thereby, an extra step for this purpose.

BRIEF DESCRIPTION OF THE DRAWING

This patent application will be described in detail with reference to the depicted in the FIG. 1, which illustrates a schematic view of a flowchart with regard to the steps of producing a granulated organic or organomineral fertilizer containing biological additives in its formulation.

DETAILED DESCRIPTION OF THE INVENTION

Before the state of the art afore described, it was developed the object of this invention patent application, which proposes an organic and/or organomineral fertilizer in granular form with the presence of biological additives in its formulation.

Technological innovation addressed by this invention patent application is based on the possibility that each granule (G) of the fertilizer containing organic matter, minerals (whether micro and/or macro) and having in its formulation biological additives (whether bacteria, fungi and yeasts), which will be specially selected for crops of interest (whether grasses, legumes, monocotyledons and dicotyledons).

To a perfect understanding of the present object of the invention patent application, it is necessary to describe the process of obtaining granulated organic and organomineral fertilizer additive with biological matter such as already provided for in state of the art, and taking as a base the flowchart of the FIG. 1.

In the aforementioned FIG. 1, the raw organic matter 1 is fed to a conveyor 2 which leads to a screen 3 to be subjected to a pre-cleaning step, being that, after this pre-cleaning step, the raw organic matter is conducted at a rotating screens station 4, where the raw organic matter already screened is led to a mill 5, where this raw mater is fragmented and homogenized as regards its granulometry, such granulometry that is about 1 mm.

After exiting the mill 5, the raw organic matter 1 is now defined as processed organic matter 1', being then sent to a mixer 6 which operates jointly with a means of stock 7, which is stored the charge of N, P, K and with a storage reservoir 8 of biological additives, this reservoir 8, wherein the liquid consisting of the bioburden to be administered to G granules at the time of its production is stored.

The storage reservoir 8 is bond to a fluid feed line 9 that presents ramifications 9A for each one of the granulating equipment 10.

In the mixer 6, processed organic matter 1' is combined with a suitable proportion of N, P, K, then passing to be denominated as the processed organic matter aggregated of NPK 1", being then sent to the granulating equipment 10 arranged in a processing area 11, wherein during the granulation step that takes place according to the conventional process, there is also the administration of the bioburden by applying a liquid additive biologically loaded and which is contained in the storage reservoir 8 being driven by the fluid feed line 9 to each of the granulating equipment 10.

The matter's bioburden fed to the granulating equipment (10) is defined according to the soil and crop analysis to be cultivated.

By leaving the granulating equipment 10, the fertilizer already in the form of suitably additive granules G is then sent to a dryer 12 where its humidity ratio in set within preset parameters, such humidity rate is 10% to 15%.

By leaving the dryer 12, the granules G are then sent to a cooler 13 and when it reaches the right temperature, which is around 50° C., granules G already dry and cold are sent for shipment 14.

The aggregation of the biological additives for granulation in the organic and organomineral fertilizer aims six key fronts, namely:

Increase of the efficiency of mineral fertilizers;
Reduction of the environmental impact;
Positive physiological effects in the plants that reduce or eliminate the abiotic and biotic stresses of the plants;
Gradual release of the nutrients to the soil;
Simplification of the production process (avoiding subsequent processes such as coating or spraying of the biological additives);
Reduction of the productive cost.

The addition of organic additives in processes where there is the use of high pressure and temperature (such as, for example, pelletization) may jeopardize the survival of the microorganisms in the biological additives. Thus, the granulation proves to be a viable and safe alternative (process without the presence of pressure or temperature).

The innovation of this process, such as it is shown in the FIG. 1, consists on including biological additives with specific combinations to certain crops in the organic fertilizer and/or organomineral formulation through industrial granulation process.

The invention claimed is:

1. A granulated organic and organomineral fertilizer comprising:
   an organic fraction from agricultural waste, said agricultural waste selected from the group consisting of poultry litter, pigs manure, manure from other animals, bagasse and sugarcane vinasse, peat and waste from other crops, to which it is added N, P, K, and
   a biological additive in the form of bacteria, fungi, or yeasts, wherein the granules receive the biological additive at the time of its granulation,
   wherein the granules are cooled in a cooler to about 50° C. after granulation and drying; and
   wherein a granulometry of the granules is about 1 mm.

2. A process of fertilizing a crop, said process comprising an application of an effective amount of the fertilizer of claim 1 to the crop.

3. A process for production of granulated organic and organomineral fertilizer supplemented with biological additive, the process comprising:
   pre-cleaning a raw organic matter;
   screening the pre-cleaned raw organic matter with a rotating screen station;
   fragmenting and homogenizing the screened raw organic matter with a mill, to provide processed organic matter;
   mixing the processed organic matter with a charge of N, P, K to provide a processed organomineral matter;
   granulating the organomineral matter with addition of a liquid comprising the biological additive to provide granules;
   drying the granules at humidity rate from 10% to 15%;
   cooling the dried granules in a cooler to about 50° C.,
   wherein the cooled granules have granulometry of about 1 mm.

4. The process of claim 2, wherein the crop is selected from the group consisting of grasses, legumes, monocotyledons and dicotyledons.

* * * * *